No. 624,451. Patented May 9, 1899.
F. BURGER.
PNEUMATIC BRAKE AND MOTOR FOR VEHICLES.
(Application filed Jan. 6, 1898.)
(No Model.) 2 Sheets—Sheet 2.
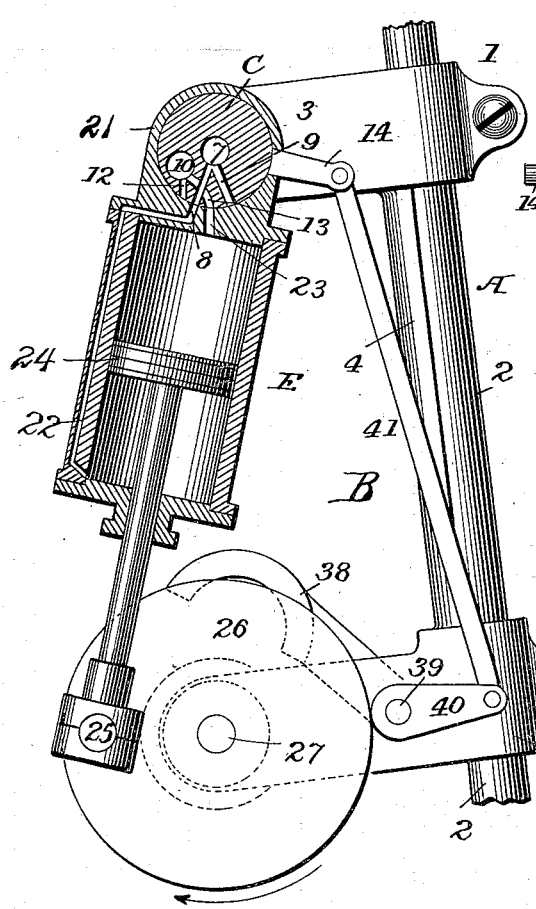
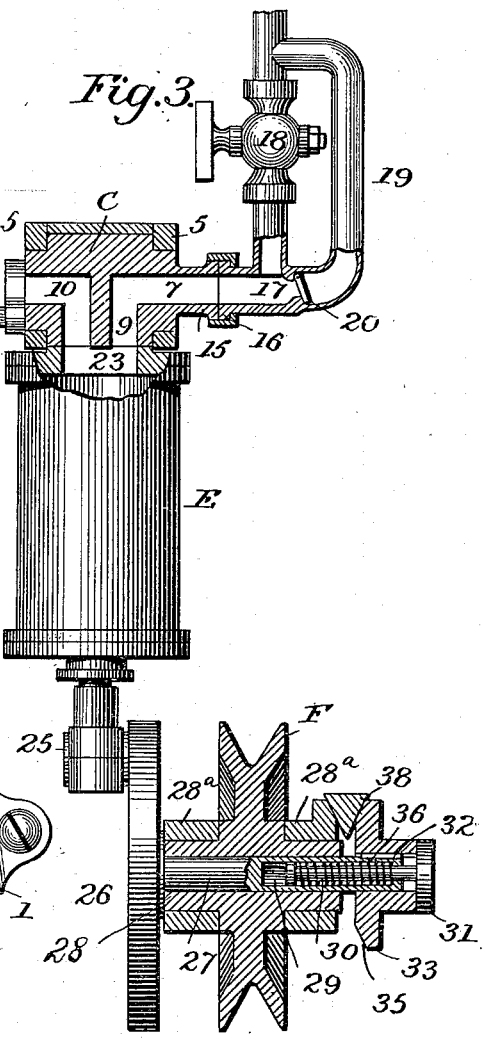
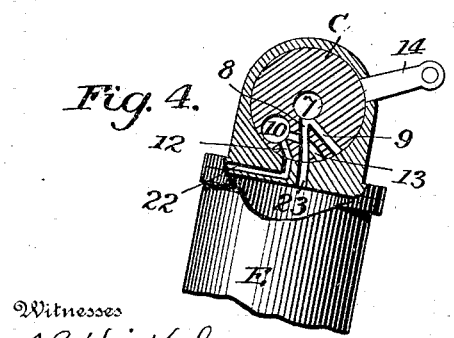
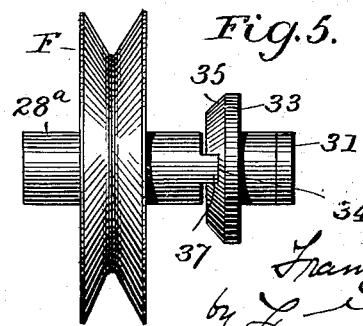

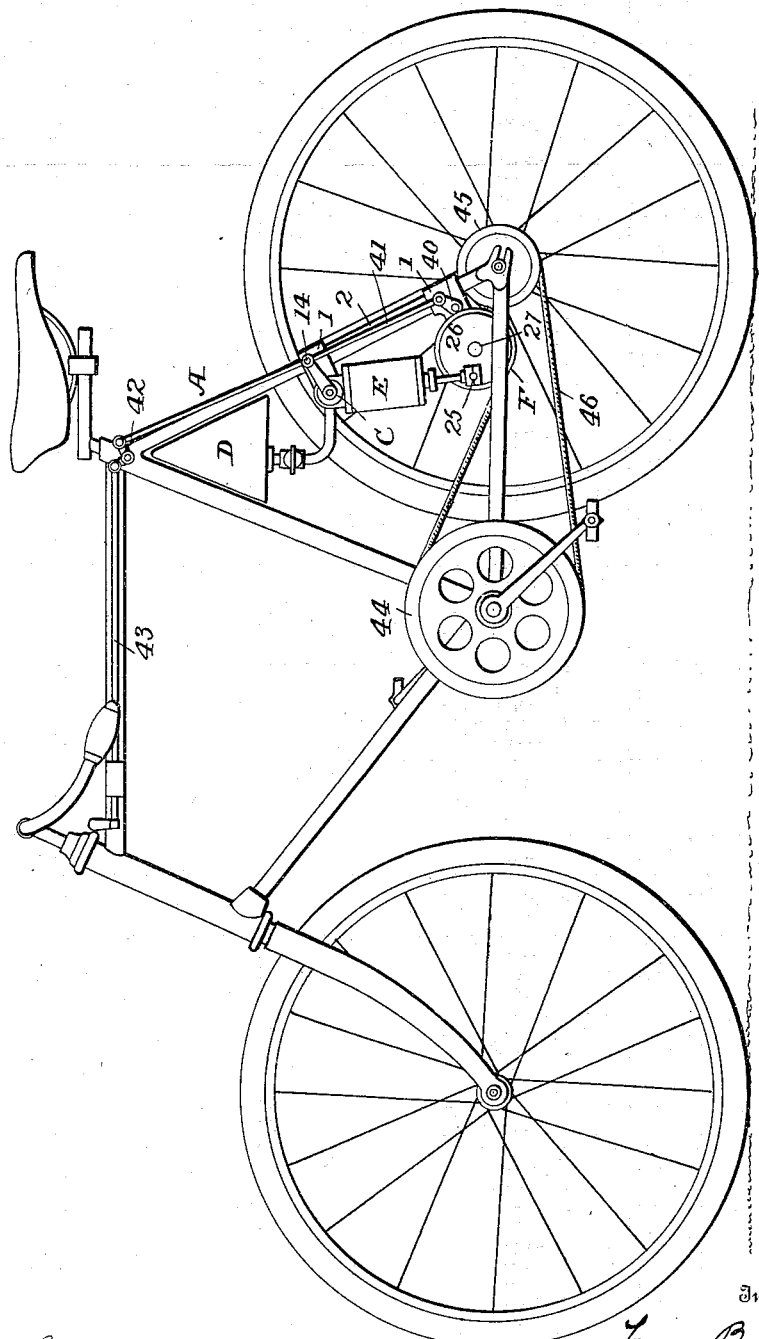

UNITED STATES PATENT OFFICE.

FRANZ BURGER, OF FORT WAYNE, INDIANA, ASSIGNOR OF THREE-FOURTHS TO HENRY M. WILLIAMS, OF SAME PLACE.

PNEUMATIC BRAKE AND MOTOR FOR VEHICLES.

SPECIFICATION forming part of Letters Patent No. 624,451, dated May 9, 1899.

Application filed January 6, 1898. Serial No. 665,772. (No model.)

*To all whom it may concern:*

Be it known that I, FRANZ BURGER, a citizen of the United States, residing at Fort Wayne, in the county of Allen and State of Indiana, have invented certain new and useful Improvements in Pneumatic Brakes and Motors for Vehicles, of which the following is a specification.

This invention relates to certain new and useful improvements in combined vehicle brakes and motors adapted more particularly for use in connection with belt or chain driven bicycles.

It is the object of the invention to combine with a bicycle or other vehicle of the type referred to a simple, light, and effective motor which may be employed for storing up power while the machine is in motion and which is adapted to be driven by the power so stored up, the said motor through suitable connections also serving to retard the forward movement of the bicycle.

With this object in view the invention consists in the novel construction, arrangement, and combination of the parts hereinafter more particularly described.

In the accompanying drawings, forming a part of this specification, and in which like letters and numerals of reference indicate corresponding parts, Figure 1 is a side elevation of a bicycle with the mechanism embodying the invention applied thereto. Fig. 2 is a detail sectional view of the motor and connections. Fig. 3 is a similar view taken on a line at right angles to Fig. 2. Fig. 4 is a detail view of a portion of the motor and compression-cylinder and the distributing-valve, and Fig. 5 is a detail view of the driving and brake wheel and its clutch.

Referring more particularly to the drawings, A designates the frame of a bicycle of any ordinary construction, and B the combined brake, compression, and driving-motor frame. This frame consists, as shown, of two separated clamps 1, adapted to embrace a member of the frame A, in the present instance the said clamps being secured around the brace-rod 2 at one side of the machine. From each of said clamps extends a supporting-bracket 3, and in order to maintain them in proper relative position the clamps are connected by a bar 4, adapted to rest in contact with the brace-rod 2.

Supported to turn in separated ears 5 of the upper bracket 3 is a distributing-valve C, the said valve being cylindrical in cross-section and provided with a main inlet-passage 7, from which two diverging branch inlet-passages 8 9 lead to its periphery, and with a main exhaust-passage 10, from which diverge two branch exhaust-passages 12 13, likewise leading to the periphery of the valve, one of said passages extending to a point on the periphery of the said valve intermediate the branch inlet-passages 8 9. At one end the valve C is provided with an arm 14, through which it is operated by means hereinafter described, and at its opposite end it is formed with a nipple 15, having a swivel connection at 16 with a supply-pipe 17, the passage of the said nipple forming a continuation of the main inlet-passage 7 and coinciding with the passage of the supply-pipe. This supply-pipe extends to a compressed-air reservoir D, supported in any desired manner upon the frame A, and it is provided with a suitable cut-off valve 18 and with a by-pass 19, which communicates with the said supply-pipe at points above and below the valve 18 and is provided with a check-valve 20.

Mounted to oscillate upon the distributing-valve C is a motor-cylinder E. As shown, this cylinder is provided at its upper end with an extension 21, provided with a transverse opening, into which is received to fit closely the distributing-valve C. At opposite sides the said extension bears upon the inner faces of the ears 5, which prevent lateral movement of the cylinder relative to the valve. In the walls of the cylinder E are formed two passages 22 23, which lead, respectively, to the front and rear ends thereof and are adapted to register alternately with the branch inlet and exhaust passages of the distributing-valve as the cylinder oscillates.

Within the cylinder E is a piston 24, the rod of which is connected at its lower end to a wrist-pin 25 upon a crank-disk 26. The shaft 27 of the disk 26 extends through the hub 28 of a brake or driving wheel F, mounted in bearings 28ª of the lower bracket, and said shaft is adapted normally to rotate within the hub independently thereof. In its outer end the shaft 27 is provided with a circular chamber 29, into which extends and is adapted to move longitudinally a rod 30, provided at its outer end with a head 31. Mounted upon a projecting end of the shaft 27 and connected by means of a spline 32 to rotate therewith and to move longitudinally thereon is a clutch member 33, provided in its inner face with recesses 34 and with a beveled edge 35. The head 31 of the rod 30 bears against the outer end of the hub of the clutch member 33, and said rod is surrounded within the chamber 29 by a coil-spring 36, the normal tendency of which is to move the rod in the direction of the disk 26 and simultaneously carry the clutch member into contact with the end of the hub 28 of the driving-wheel F. The end of this hub is provided with two or more projections 37, which are adapted to enter the recesses 34 of the clutch member 33 when said hub and clutch are brought together, thereby effecting a connection between the shaft 27 and driving-wheel F to rotate the latter.

Any suitable means may be employed for effecting connection or disconnection between the clutch member 33 and the driving-wheel F, that shown comprising a wedge-shaped lever 38, connected at one end upon a short horizontal shaft 39, mounted in the bracket 3, and adapted at its opposite end to enter between the bevel edge 35 of the clutch member and a corresponding surface of the bracket 3 to separate the clutch member and driving-wheel F. Likewise connected to the horizontal lever 39 is an arm 40, which is in turn connected to the valve-operating arm 14 by means of a rod 41, to be moved simultaneously therewith. This rod 41, as shown, extends upward to the seat-post, where it is connected to an arm of a bell-crank lever 42, pivoted upon the frame A, and to the opposite arm of said lever is connected a second operating-rod 43, having its end provided with a handle and extending to a point within easy reach of the rider.

The driving-wheel F is arranged intermediate the usual sprocket-wheels 44 45 of the bicycle, its lower edge extending below a straight line drawn from the upper edge of one of said wheels to that of the other, and the said lower edge of the driving-wheel engages with the usual driving belt or chain 46 of the bicycle, causing a bend in its upper limb intermediate the front and rear sprocket-wheels.

When a belt is used to connect the wheels 44 45, as shown, the driving-wheel F is provided in its periphery with a wedge-shaped groove. It will be understood, however, that a sprocket-wheel may be substituted for said wheel when the usual driving-chain is employed.

In operation, assuming the parts to be in the positions shown in Fig. 2, with the valve 18 open and the crank-disk 26 and driving-wheel F connected together, compressed air will flow from the reservoir D and enter the front end of the motor-cylinder E through the passages 7, 8, and 22, forcing the piston upward and rotating the crank-disk in the direction of the arrow, and by means of the engagement of said disk with the driving chain or belt 46 the bicycle will be propelled forward. During the time the piston is moving upward the passages 13 and 23 have been brought to register with each other, and the air in the upper end of the cylinder escapes through said passages into the exhaust-passage 10 and out through the end of the distributing-valve. When the piston has reached the limit of its upstroke and starts upon its downstroke, the cylinder E is caused to turn upon the distributing-valve, thereby bringing the passages 7, 8, and 23 into communication, resulting in the introduction of compressed air into the upper end of the cylinder. This turning of the cylinder upon the distributing-valve also brings the passages 10, 12, and 22 to coincide, permitting the air in front of the piston to escape. As thus arranged it will be obvious that the motor acts to drive the bicycle, and as it is employed in connection with the usual crank-and-pedal driving mechanism it will be seen that it will materially assist the rider in pedaling upgrade. When traveling downgrade and it is desired to reduce the speed of the wheel or when it is desired to replenish the reservoir with compressed air, the distributing-valve F is moved by the operator through the operating-rod 43 and the intermediate connections to the position shown in Fig. 4. The cut-off valve 18 is then closed, stopping the flow of compressed air to the cylinder. When the valve F is thus shifted, the passage 12 is brought to register with the passage 22 on the upstroke of the piston, causing air to be drawn into the forward end of the cylinder, and the passage 23 is brought into communication with the passages 7 8, through which the air as it becomes compressed in the upper end of the cylinder escapes to the supply 17, forcing open the check-valve 20, and flows through the by-pass 19 to the reservoir. Upon the downstroke of the piston the cylinder E is moved to the left of the vertical, bringing the passage 22 into register with the passages 7 8, and through these passages the air as it is compressed in the forward end of the cylinder is forced into the reservoir in the manner above stated. When the passages 7, 8, and 22 are thus brought to register, the passages 10, 13, and 23 coincide with each other, permitting air to be drawn into the upper end of the cylinder through the exhaust-port prior to the next up or compression stroke of the piston. It will be obvious that when the motor is converted into an air-compressor, as above described, by reason of the resistance offered to the movement of the piston by the air as it is being compressed in the cylinder and the consequent retardation of the rotation of the driving-wheel said wheel will act upon the driving chain or belt to decrease the rate of speed of the wheel. When it is desired to throw the motor wholly out of use, the valve-operating arm 14 is shifted through the rod 43 and the intermediate connections to throw the distributing-valve so far to the right that communication between the passages 8, 9, 12, and 13 and the passages 22 and 23 is prevented.

I do not limit myself to the exact construction and arrangement of the parts shown and described, since it will be obvious that various changes in such construction and arrangement may be made without departing from the spirit or scope of the invention.

What I claim is—

1. The combination with a belt or chain driven vehicle, of a wheel coöperating with the chain thereof, a compressed-air reservoir mounted on the vehicle, a motor likewise mounted upon the vehicle for driving said wheel and a passage connecting the motor and reservoir provided with valves one of which is adapted to permit the flow of air from the motor to the reservoir and the other permitting air to flow from the reservoir to the motor, substantially as described.

2. The combination with a chain or belt driven vehicle, of a wheel coöperating with the chain thereof, a motor connected with said wheel, and means for converting the motor into a fluid-compressor causing it to resist the rotation of said wheel, substantially as described.

3. The combination with a chain or belt driven vehicle, of a wheel coöperating with the chain thereof, a motor, a reservoir connected to the motor, and means whereby the motor is operated from the chain to compress air and force it into the reservoir, substantially as described.

4. The combination with a chain or belt driven vehicle, of a wheel coöperating with the chain thereof, a motor mounted upon the vehicle comprising a stationary valve having inlet and exhaust passages, and a cylinder adapted to oscillate with respect to the valve, and having passages leading to opposite ends thereof, and connections between the motor and the said wheel, substantially as described.

5. The combination with a chain or belt driven vehicle, of a wheel coöperating with the chain thereof, a motor connected to the wheel, a compressed-air reservoir communicating with the motor, and devices whereby the motor may be driven by compressed air from the reservoir or driven from the wheel, substantially as described.

In testimony whereof I have signed my name to this specification in the presence of two subscribing witnesses.

FRANZ BURGER.

Witnesses:
GEO. K. TORRENCE,
J. BURGER.